United States Patent [19]

Chiba

[11] Patent Number: 4,516,408

[45] Date of Patent: May 14, 1985

[54] REFRIGERATION SYSTEM FOR REFRIGERANT HEATING TYPE AIR CONDITIONING APPARATUS

[75] Inventor: Mitsuyoshi Chiba, Fuji, Japan

[73] Assignee: Kabushiki Kaisha Toshiba, Kawasaki, Japan

[21] Appl. No.: 605,078

[22] Filed: Apr. 30, 1984

[30] Foreign Application Priority Data

May 25, 1983 [JP] Japan ................................. 58-90626

[51] Int. Cl.³ ............................................ F25B 27/02
[52] U.S. Cl. .................................. 62/238.7; 62/324.4
[58] Field of Search ............... 62/160, 324.6, 324.4, 62/238.6, 238.7, 196.4; 237/2 B

[56] References Cited

U.S. PATENT DOCUMENTS 4,179,894 12/1979 Hughes ........................... 237/2 B
4,399,664 8/1983 Derosier ........................... 62/324.4

FOREIGN PATENT DOCUMENTS 54-39243 3/1979 Japan ................................. 62/324.6

*Primary Examiner*—William E. Wayner
*Attorney, Agent, or Firm*—Schwartz, Jeffery, Schwaab, Mack, Blumenthal & Koch

[57] ABSTRACT

A refrigeration system for a refrigerant heating type air conditioning apparatus has a compressor and heat exchangers, a refrigerant heating device for heating the refrigerant during the heating operation, a releasing circuit for bypassing a portion of refrigerant, valves for changing refrigerant flow, and a flow circuit for removing the refrigerant from an outdoor heat exchanger. The refrigerant is withdrawn from the outdoor heat exchanger without interrupting the heating cycle.

14 Claims, 2 Drawing Figures

REFRIGERATION SYSTEM FOR REFRIGERANT HEATING TYPE AIR CONDITIONING APPARATUS

BACKGROUND OF THE INVENTION

The invention relates to a refrigeration system for a refrigerant heating type air conditioning apparatus, and more particularly to an air conditioning apparatus for withdrawing refrigerant from a heat exchanger located outdoors.

A heat pump type air conditioning apparatus generally has a drawback in that its heating capacity is reduced with a fall in atmospheric temperature. Therefore an air conditioning apparatus has been developed which is provided with a refrigerant heating device designed to heat the refrigerant by, for example, a gas burner or electric heater during the cold season to make up for the decline in the heating capacity of the apparatus.

A conventional refrigerant system of a refrigerant heating type air conditioning apparatus, sometimes referred to as a heat pump, is shown in FIG. 1. the refrigerant system has a main circuit 1, including a compressor 2, a four-way valve 3, having ports a, b, c and d, a heat exchanger 4 located outdoors, a main capillary tube 5, check valves 6, 7, a heat exchanger 8 located indoors, an evaporator 18, and an accumulator 9.

The refrigerant system further has a refrigerant heating device 10 for heating the evaporator 18 and an electromagnetic valve 11 so that refrigerant may bypass the exchanger 4 during the heating operation. The compressor 2 is also connected with a releasing circuit 12 which acts to return a portion of the refrigerant from the pressure chamber of the compressor 2 towards the suction side thereof for balanced heating and cooling capacity of the system. The releasing circuit 12 includes an electromagnetic valve 13 and a capillary tube 14. Further, a refrigerant withdrawing circuit 15 is provided for the outdoor heat exchanger 4 so as to withdraw the remaining refrigerant therefrom during the heating operation. The withdrawing circuit 15 has check valves 16, 17, as shown in FIG. 1.

During the heating operation, the four-way valve 3 is opened connecting ports a and b together and c and d together, so as to connect compressor 2 with indoor heat exchanger 8. Further, both electromagnetic valves 11 and 13 are also opened so as to heat refrigerant in the refrigerant heating device 10. During the heating cycle, the refrigerant flows in the refrigerant system, as shown by solid arrows in FIG. 1.

In the cooling cycle, four-way valve 3 is opened to connect ports a and c together and ports b and d together, and valves 11 and 13 are closed. Refrigerant flows in the direction of the dotted arrows through heat exchanger 4, main capillary tube 5, check valve 6, heat exchanger 8, four-way valve 3, check valve 7 and accumulator 9.

In the heating operation, the refrigerant heating type air conditioning apparatus generally has a drawback in that the heating capacity is reduced with a fall in atmospheric temperature in part because of accumulated refrigerant within the outdoor heat exchanger 4. Such refrigerant condenses and accumulates in the outdoor heat exchanger 4 and results from leakage from check valves 6 and 7 and also leakage from compressor 2 through four-way valve 3 during operation of valve 3.

Therefore, conventional apparatus acts so as to withdraw the refrigerant from exchanger 4 with the start of each heating operation, or when a predetermined amount of refrigerant is accumulated therein, as described hereinafter.

In the refrigerant withdrawing operation, the compressor 2 pumps the refrigerant after closing electromagnetic valves 11, 13 and opening four-way valve 3, thereby connecting ports a and b together as well as ports c and d together. In this case, the refrigerant in the outdoor heat exchanger 4 is withdrawn via the suction pressure of the compressor 2 into the inlet side of compressor 2 through the withdrawing circuit 15, check valve 17, four-way valve 3, and check valve 7. However, since the refrigerant withdrawing circuit 15 is isolated from the refrigerant high pressure via valves 6 and 11, the suction side of compressor 2 has no connection with the high pressure side. Therefore, the compressor 2 does not operate in its normal mode of operation and often is unreliable when operated once again in its normal mode. Additionally, there is a drawback that the heating operation is stopped during the refrigerant withdrawing operation.

SUMMARY OF THE INVENTION

It is a primary object of the present invention to obviate defects encountered in a conventional refrigerant heating type air conditioning apparatus.

Another object of the invention is to provide an improved refrigerant heating type air conditioning apparatus capable of withdrawing the refrigerant from the outdoor heat exchanger during the heating operation.

It is a further object of the invention to provide a refrigerant heating type air conditioning apparatus wherein the refrigerant is prevented from flowing into the outdoor heat exchanger at the end of the heating operation.

According to this invention, there is provided a refrigeration system for a refrigerant heating type air conditioning apparatus comprising a main circuit including a compressor, a four-way valve connected to the high pressure side of the compressor, an outdoor heat exchanger, a main capillary tube, and an indoor heat exchanger connected to the low pressure side of the compressor through the four-way valve, a refrigerant heating device connected to the indoor heat exchanger so as to heat refrigerant during the heating operation, a releasing circuit connected to the outlet side of the compressor for bypassing a portion of refrigerant toward the four-way valve, means for changing flow of the bypassing refrigerant to the outdoor heat exchanger or the four-way valve, and means for removing the refrigerant from the outdoor heat exchanger.

BRIEF DESCRIPTION OF THE DRAWINGS

Features of the present invention will be apparent from the following drawings, wherein.

DETAILED DESCRIPTION OF THE PREFERRED EMBODIMENT

Now, an embodiment of the refrigeration system according to the present invention will be described with reference to the accompanying drawing.

Figure 1:
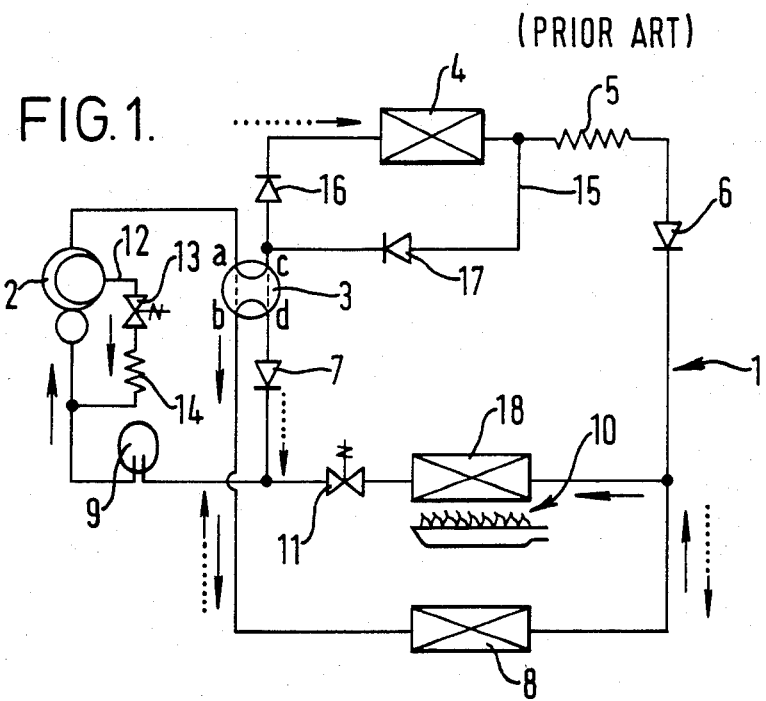
FIG. 1 shows a conventional refrigeration system for a refrigerant heating type air conditioning apparatus.
Figure 2:
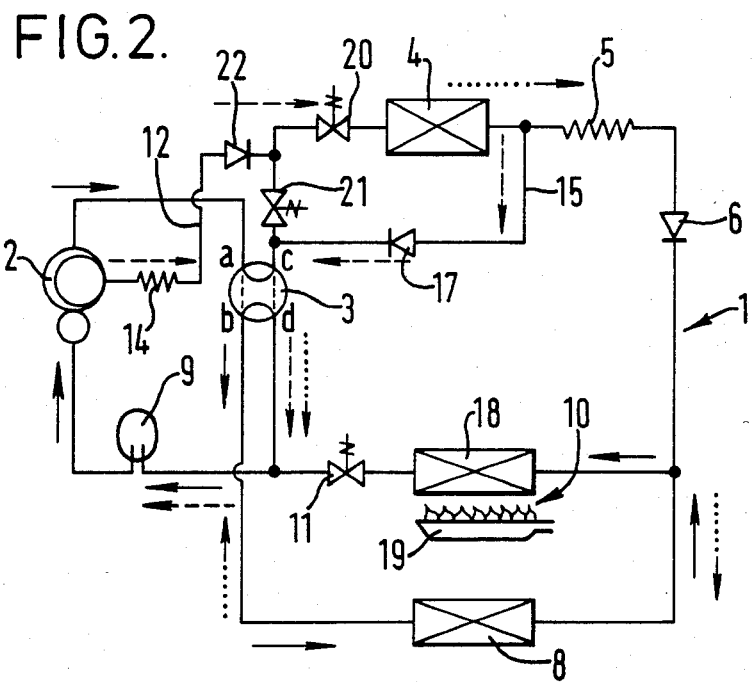
FIG. 2 shows an embodiment of refrigeration system for a refrigerant heating type air conditioning apparatus in accordance with the invention.

Referring to FIG. 2, there is illustrated by the solid arrows the refrigerant flow during a heating operation of the apparatus. The refrigerant discharged from compressor 2 passes through the four-way valve 3 which is opened to connect ports a and b together and c and d together so as to circulate refrigerant into the indoor heat exchanger 8 now acting as a condenser, the refrigerant heating device 10 (including evaporator 18 and burner 19), the electromagnetic valve 11, and accumulator 9.

The outdoor heat exchanger 4 is connected to the four-way valve 3 through electromagnetic valves 20, 21. The outlet side of outdoor heat exchanger 4 is connected to the inlet side of evaporator 18 through a main capillary tube 5 and a check valve 6. A main cooling cycle circuit 1 is formed by compressor 2, four-way valve 3, outdoor heat exchanger 4, main capillary tube 5, indoor heat exchanger 8 and accumulator 9, as shown by the dotted arrow path.

A releasing circuit 12 is provided from the outlet side of compressor 2. The releasing circuit 12 has a capillary tube 14 and a check valve 22, for preventing the refrigerant from flowing oppositely, and is connected between electromagnetic valves 20 and 21. Also, a refrigerant withdrawing circuit 15 is provided between the outlet side of the outdoor heat exchanger 4 and the electromagnetic valve 21. The refrigerant withdrawing circuit 15 has a check valve 17 as shown in FIG. 2.

The refrigerant heating type air conditioning apparatus according to this invention operates in the following manner.

In the cooling operation, at first, both electromagnetic valves 20 and 21 are opened, valve 11 is closed, and four-way valve 3 is opened to connect ports a and c together and b and d together so as to connect compressor 2 to outdoor heat exchanger 4. The refrigerant is circulated from compressor 2 to accumulator 9 through four-way valve 3, outdoor heat exchanger 4, main capillary tube 5, check valve 6, indoor heat exchanger 8, and four-way valve 3. In this case, the refrigerant is condensed at the outdoor heat exchanger 4, and is vaporized at the indoor heat exchanger 8 so as to absorb indoor heat thereby providing indoor cooling. The refrigerant flow in the cooling cycle is shown in FIG. 2 by the dotted arrows.

In the heating operation, electromagnetic valve 20 is closed, both valves 21 and 11 are opened, and four-way valve 3 is turned to connect ports a and b together and c and d together so as to connect compressor 2 to indoor heat exchanger 8. The burner 19 is turned on to heat the refrigerant in the evaporator 18. Thus, the refrigerant is circulated from compressor 2 to accumulator 9 through four-way valve 3, indoor heat exchanger 8, and evaporator 18. In this case, the refrigerant cannot flow toward main capillary tube 5 because of check valve 6, and thus it flows toward evaporator 18. The refrigerant is condensed at the indoor heat exchanger 8, and is vaporized at the evaporator 18 so as to perform room heating. The refrigerant flow is shown in FIG. 2 by the solid arrows.

At the same time of the heating operation, a portion of refrigerant is circulated from compressor 2 to the capillary tube 14 of the releasing circuit 12, check valve 22, electromagnetic valve 21, four-way valve 3 (through ports c and d) and subsequently to the accumulator 9. Since the circulated amount of refrigerant is reduced in the heating operation in comparison with that of the cooling operation, the capacities of the cooling and heating cycles are balanced.

In the event that a predetermined amount of refrigerant is accumulated in outdoor heat exchanger 4 by leakage from the check valves 6, 17, a refrigerant withdrawing operation begins by opening of electromagnetic valve 20 and closing of valve 21. In this withdrawing cycle, refrigerant is circulated from releasing circuit 12, outdoor heat exchanger 4, to valves 22 and 20, check valve 17, ports c and d of four-way valve 3, and into accumulator 9, as shown by dashed arrows.

Thus, the accumulated refrigerant is removed from the outdoor heat exchanger 4 by the releasing circuit 12 through the refrigerant withdrawing circuit 15 without stopping of the heating operation. Problems of the unreliability or non-durability of the compressor 2 do not occur since the compressor 2 is always operated in its normal mode of operation with sufficient refrigerant being fed to its suction side.

Table 1 gives the positions of the valves 3, 11, 20, and 21 for the various modes of operation previously described. In this table, the "open" position of the three-way valve corresponds to the position in which ports a and c are connected together and ports b and d are connected together. In the "closed" position, ports a and b are connected together and ports c and d are connected together.

TABLE 1

|  | Cooling Operation | Heating Operation | Refrigerant Withdrawing Operation |
|---|---|---|---|
| Valve 3 | (a-c) Open (b-d) | (a-b) Close (c-d) | (a-b) Close (c-d) |
| Valve 11 | Close | Open | Open |
| Valve 20 | Open | Close (or Open) | Open |
| Valve 21 | Open | Open (or Close) | Close |

Flow of the refrigerant into outdoor heat exchanger 4 through the four-way valve 3 during the heating operation is prevented since at least one of electromagnetic valves 20 and 21 is closed during the heating operation.

In summary, the invention has the releasing circuit 12 connected between compressor 2 and four-way valve 3, and electromagnetic valves 20 and 21 for controlling the direction of flow of the refrigerant in the releasing circuit. Therefore, the refrigerant withdrawing operation can be performed at the same time as the heating operation. Additionally, the freezing cycle is operated in a normal manner, even if the refrigerant withdrawing operation is performed. Accordingly, there is no need for stopping the heating operation in order to start the refrigerant withdrawing operation, and no problems develop as to reliability of the compressor.

In a broader aspect of the invention, it is possible to use a three-way valve instead of the separate valves 20, 21.

While the invention has been described in reference to preferred embodiments, it will be understood by those skilled in the art that various modifications may be made without departing from the spirit and scope of the invention as set forth in the appended claim.

What is claimed is:

1. A refrigeration system for a refrigerant heating type air conditioning apparatus having a main circuit including a compressor for circulating refrigerant, a four-way valve connected to the high pressure side of the compressor for changing the direction of flow of the refrigerant, an outdoor heat exchanger (4) connected for receiving the refrigerant through the four-way valve and condensing the refrigerant, a main capillary tube connected to receive the condensed refrigerant, a check valve connected to receive refrigerant from the capillary tube, and an indoor heat exchanger (8) provided between the check valve and the four-way valve for exchanging heat with air, said system comprising:

a refrigerant heating device (10) connected to the indoor heat exchanger during a heating cycle, for heating and vaporing the refrigerant;

a releasing circuit connected to the outlet side of the compressor, for bypassing a portion of refrigerant toward the four-way valve;

valve means for changing the refrigerant flow direction from the releasing circuit toward the outdoor heat exchanger or the four-way valve; and means for removing the refrigerant from the outdoor heat exchanger according to the flow direction of said refrigerant.

2. A refrigeration system according to claim 1, wherein said valve includes a first electromagnetic valve provided between the outdoor heat exchanger and the four-way valve.

3. A refrigeration system according to claim 2, wherein said valve means includes said first electromagnetic valve connected to the inlet side of said outdoor heat exchanger, and a second electromagnetic valve connected between said first electromagnetic valve and the four-way valve.

4. A refrigeration system according to claim 3, wherein the outlet side of the releasing circuit is connected between the first and second electromagnetic valves.

5. A refrigeration system according to claim 3, wherein one of said first and second electromagnetic valves is closed during the heating operation.

6. A refrigeration system according to claim 1, wherein the releasing circuit includes a check valve.

7. A refrigeration system according to claim 1, wherein the refrigerant removing means comprises a circuit connected to the outlet of said outdoor heat exchanger and a check valve, said check valve being connected to said four-way valve.

8. A heat pump comprising:
(a) a compressor for pumping a refrigerant,
(b) a multi-port valve connected to said compressor for directing the flow of said refrigerant,
(c) an outdoor heat exchanger having an inlet and an outlet connected to said multi-port valve,
(d) a capillary tube connected to the outlet of said outdoor heat exchanger,
(e) an indoor heat exchanger having an inlet connected to said capillary tube and an outlet connected to said multi-port valve,
(f) an evaporator having an inlet connected between said capillary tube and said indoor heat exchanger and an outlet connected to said compressor,
(g) means for heating said evaporator,
(h) said heat pump operative in a cooling cycle for passing refrigerant from said compressor and multi-port valve to said outdoor heat exchanger and capillary tube, said indoor heat exchanger and back to said compressor,
(i) said heat pump operative in a heating cycle for passing refrigerant from said compressor and multi-port valve to said indoor heat exchanger and subsequently to said evaporator and back to said compressor,
(j) a releasing circuit connected from said compressor to said multi-port valve for adjusting refrigerant flow between said heating and cooling cycles, and
(k) said heat pump operative in a withdrawing cycle for passing refrigerant via said releasing circuit from said compressor to said outdoor heat exchanger and subsequently to said multi-port valve for joining refrigerant passing from said evaporator to said compressor during said heating cycle, said withdrawing cycle operative together with said heating cycle.

9. A heat pump as recited in claim 8, further comprising a first valve connected to said releasing circuit between said compressor and outdoor heat exchanger, and a second valve connected between said first valve and said multi-port valve.

10. A heat pump as recited in claim 8, further comprising a check valve connected between said capillary tube and said indoor heat exchanger.

11. A heat pump as recited in claim 8, further comprising an additional valve connected between said evaporator and said compressor.

12. A heat pump as recited in claim 9, further comprising an additional valve connected between said evaporator and said compressor.

13. A heat pump as recited in claim 9, further comprising a check valve connected between said capillary tube and said indoor heat exchanger.

14. A heat pump as recited in claim 13, further comprising an additional valve connected between said evaporator and said compressor.

* * * * *